US012698208B2

(12) United States Patent
Wu et al.

(10) Patent No.: US 12,698,208 B2
(45) Date of Patent: Aug. 4, 2026

(54) LITHIUM-CONTAINING MATERIAL

(71) Applicant: Huzhou Nanmu-Nano Science and Technology Co., Ltd., Huzhou City (CN)

(72) Inventors: Junjie Wu, Huzhou City (CN); Xinhua Zhang, Huzhou City (CN); Qidong Weng, Huzhou City (CN); Yong Zhou, Huzhou City (CN)

(73) Assignee: Huzhou Nanmu-Nano Science and Technology Co., Ltd., Huzhou City (CN)

( * ) Notice: Subject to any disclaimer, the term of this patent is extended or adjusted under 35 U.S.C. 154(b) by 269 days.

(21) Appl. No.: 18/683,179

(22) PCT Filed: Jan. 29, 2022

(86) PCT No.: PCT/CN2022/074866
§ 371 (c)(1),
(2) Date: Feb. 12, 2024

(87) PCT Pub. No.: WO2023/019886
PCT Pub. Date: Feb. 23, 2023

(65) Prior Publication Data
US 2024/0343580 A1     Oct. 17, 2024

(30) Foreign Application Priority Data

Aug. 19, 2021    (CN) .......................... 202110956905.6

(51) Int. Cl.
C01B 25/455        (2006.01)
H01M 4/62         (2006.01)
(52) U.S. Cl.
CPC ........... C01B 25/455 (2013.01); H01M 4/628 (2013.01); C01P 2002/52 (2013.01);
(Continued)

(58) Field of Classification Search
CPC .... H01M 4/131; H01M 10/0525; Y02E 60/10
See application file for complete search history.

(56) References Cited

U.S. PATENT DOCUMENTS

2007/0298324 A1    12/2007    Kawasato et al.
2017/0092940 A1     3/2017    Kim et al.

FOREIGN PATENT DOCUMENTS

CN        102372275 A     3/2012
CN        103151480 A     6/2013
(Continued)

OTHER PUBLICATIONS

Chinese First Office Action for Application No. 202110956905.6 dated Oct. 13, 2022, 12 pages with machine translation.
(Continued)

*Primary Examiner* — Khanh T Nguyen
(74) *Attorney, Agent, or Firm* — TraskBritt

(57)        ABSTRACT

A lithium-containing material is white powder. The lithium-containing material contains components of lithium (Li), aluminum (Al), phosphorus (P), fluorine (F) and oxygen (O) elements. The contents of the elements in mass ratio are as follows: the content of the lithium element is greater than 0% and less than or equal to 12%, the content of the aluminum element is 5%-40%, the content of the phosphorus element is 1%-35%, the content of the fluorine element is 0.4%-22%, and the content of the oxygen element is 2%-34%. The lithium-containing material is used as an electrode additive material or diaphragm coating material of a lithium-ion battery.

9 Claims, 1 Drawing Sheet

(52) U.S. Cl.
  CPC ....... *C01P 2002/72* (2013.01); *C01P 2006/11*
    (2013.01); *C01P 2006/40* (2013.01); *C01P*
    *2006/80* (2013.01)

(56)                    References Cited

FOREIGN PATENT DOCUMENTS

| CN | 106920947 A | 7/2017 |
| CN | 110660959 A | 1/2020 |
| CN | 113745515 A | 12/2021 |

OTHER PUBLICATIONS

Chinese Second Office Action for Application No. 202110956905.6
dated Oct. 13, 2022, 8 pages with machine translation.
International Search Report for Application No. PCT/CN2022/
074866 dated Apr. 18, 2022, 2 pages.
International Written Opinion for Application No. PCT/CN2022/
074866 dated Apr. 18, 2022, 4 pages.
Chinese Office Action for Chinese Application No. 202110956905.
6, dated Jun. 30, 2023, 8 pages with English translation.
Chinese Office Action for Chinese Application No. 202110956905.
6, dated Oct. 13, 2022, 9 pages with English translation.
Chinese Office Action for Chinese Application No. 202110956905.
6, dated Oct. 7, 2023, 2 pages of original documents only.

LITHIUM-CONTAINING MATERIAL

CROSS-REFERENCE TO RELATED APPLICATIONS

This application is a national phase entry under 35 U.S.C. § 371 of International Patent Application PCT/CN2022/074866, filed Jan. 29, 2022, designating the United States of America and published as International Patent Publication WO 2023/019886 A1 on Feb. 23, 2023, which claims the benefit under Article 8 of the Patent Cooperation Treaty of Chinese Patent Application Serial No. 202110956905.6, filed Aug. 19, 2021.

TECHNICAL FIELD

The present disclosure relates to the technical field of materials, in particular, to a lithium-containing material.

BACKGROUND

With the wide application and rapid development of lithium batteries, the demand for the performance of lithium-ion batteries becomes increasingly higher. Specifically, lithium batteries are expected to have a high capacity, a good capacity retention rate during repeated charging and discharging, a good cycling property, a long service life and a high safety property.

To prolong the service life of a battery, the following two factors are usually considered: the structural stability of a positive electrode, a negative electrode, a diaphragm and an electrolyte material, the improvement of which allows the structure of the battery to stay the same during multiple cycles; and the external and service conditions of the battery.

However, the prolonging of the service life of the battery by improving the external and service conditions of the battery is limited. Only by improving the material performance that determines the "battery gene" inside the battery can the cycling property of the battery be fundamentally improved. In order to prolong the service life of lithium batteries, a novel lithium-containing material can be used to improve the cycling property of lithium batteries, thus prolonging the service life of batteries.

BRIEF SUMMARY

An embodiment of the present disclosure provides a lithium-containing material, which has a good electrolyte wettability and a good lithium-ion conductivity, can inhibit lithium dendrites, and can improve the service life and cycling property of a lithium battery.

An embodiment of the present disclosure provides a lithium-containing material, which is white powder. The lithium-containing material comprises components of lithium (Li), aluminum (Al), phosphorus (P), fluorine (F), and oxygen (O); wherein by mass, more than 0% and less than or equal to 12% of lithium (Li), 5%-40% of aluminum (Al), 1%-35% of phosphorus (P), 0.4%-22% of fluorine (F) and 2%-34% of oxygen (O).

The lithium-containing material is used as an electrode additive material or a diaphragm coating material of a lithium-ion battery.

Preferably, an X-ray diffraction (XRD) pattern of the lithium-containing material has characteristic diffraction peaks at positions where 2θ is 28°, 30° and 19°.

Preferably, a tap density of the lithium-containing material is 0.60-1.48 g/cm³.

Preferably, a solubility of the lithium-containing material is less than 1 g/100 g in water, ethanol and N-methylpyrrolidone (NMP).

Preferably, a total content of magnetic impurities in the lithium-containing material is less than 1.5 ppm, wherein the magnetic impurities comprise one or more of Cr, Fe, Ni, Zn and Co.

Further preferably, in the lithium-containing material, the content of Cr is ≤0.15 ppm, the content of Fe is ≤1.35 ppm, the content of Ni is ≤0.04 ppm, the content of Zn is ≤0.01 ppm, and the content of Co is ≤0.01 ppm.

Preferably, the lithium-containing material is also doped with element M, the content of M in the lithium-containing material is 0%-30%, and M is selected from any one of H, K, Cl or Na.

Preferably, the general formula of the lithium-containing material is $Li_{1+x}M_{1-x}Al(PO_4)O_{1-y}F_{2y}$, where $0 \leq x \leq 1$ and $0 < y < 0.1$.

The lithium-containing material provided by the embodiment of the present disclosure has a good electrolyte wettability and a good lithium-ion conductivity, can inhibit lithium dendrites, and can improve the service life and cycling property of a lithium battery.

BRIEF DESCRIPTION OF THE DRAWINGS

The technical solution of the embodiments of the present disclosure will be described in further detail with reference to the drawings and embodiments.

DETAILED DESCRIPTION

The invention will be further explained below with reference to drawings and specific embodiments, but it should be understood that these embodiments are only for more detailed explanation, and should not be construed as limiting the present disclosure in any way, that is, not intended to limit the scope of protection of the present disclosure.

A lithium-containing material provided by an embodiment of the present disclosure is white powder. The lithium-containing material comprises components of lithium (Li), aluminum (Al), phosphorus (P), fluorine (F), and oxygen (O), wherein by mass, more than 0% and less than or equal to 12% of lithium (Li), 5%-40% of aluminum (Al), 1%-35% of phosphorus (P), 0.4%-22% of fluorine (F) and 2%-34% of oxygen (O).

In a solution, the lithium-containing material is also doped with element M, the content of M in the lithium-containing material is 0%-30%, and M is selected from any one of H, K, Cl or Na.

The general formula of the lithium-containing material is $Li_{1+x}M_{1-x}Al(PO_4)O_{1-y}F_{2y}$, where $0 \leq x \leq 1$ and $0 < y < 0.1$.

An X-ray diffraction pattern of the lithium-containing material provided by the present disclosure has obvious characteristic diffraction peaks at positions where 2θ is 28°, 30° and 19°.

A tap density of the lithium-containing material provided by the present disclosure is 0.60-1.48 g/cm³.

A solubility of the lithium-containing material provided by the present disclosure is less than 1 g/100 g in water, ethanol and N-methylpyrrolidone (NMP).

A total content of magnetic impurities in the lithium-containing material provided by the present disclosure is less than 1.5 ppm, wherein the magnetic impurities comprise one or more of Cr, Fe, Ni, Zn and Co. Specifically, the content of Cr is ≤0.15 ppm, the content of Fe is ≤1.35 ppm, the content of Ni is ≤0.04 ppm, the content of Zn is ≤0.01 ppm, and the content of Co is ≤0.01 ppm.

The lithium-containing material provided by the present disclosure can be used as an electrode additive material or a diaphragm coating material of a lithium-ion battery, and the material has a good electrolyte wettability and a good lithium-ion conductivity, can inhibit lithium dendrites, and can improve the service life and cycling property of a lithium battery.

Embodiment 1

It can be seen from appearance that a lithium-containing material in this embodiment is white powder, and the general formula of the lithium-containing material satisfies $Li_{1+x}M_{1-x}Al(PO_4)O_{1-y}F_{2y}$. The chemical formula is $Li_2Al(PO_4)O_{0.94}F_{0.12}$ when element M does not exist. Specifically, the lithium-containing material comprises, by mass, about 8.6% of lithium, 35% of aluminum, 28% of phosphorus, about 16% of fluorine, and about 12.4% of oxygen.

Figure 1:
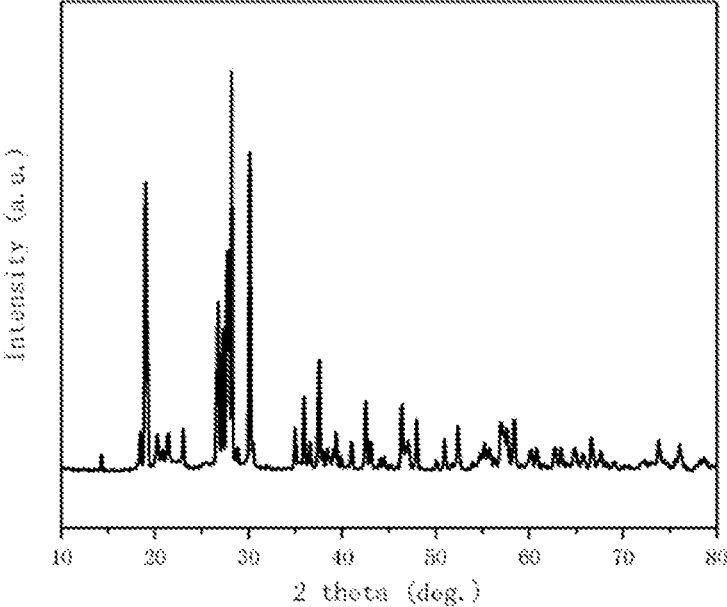
FIG. 1 is an X-ray diffraction (XRD) pattern of a lithium-containing material according to an embodiment of the present disclosure.

An XRD diffraction pattern of the material is shown in FIG. 1, where obvious characteristic diffraction peaks can be seen at positions where $2\theta$ is 28°, 30° and 19°. Tests showed that a tap density of the material was 1.08 $g/cm^3$.

ICP elemental analysis of the material showed that the content of lithium was 8.45%, the content of aluminum was 34.7%, the content of Cr was 0.1298 ppm, the content of Fe was 1.2052 ppm, the content of Ni was 0.0276 ppm, the content of Zr was 0 ppm, the content of Co was 0.0006 ppm, and the total content of magnetic substances was 1.3632 ppm.

A ternary positive electrode material NCM622, carbon black, polyvinylidene fluoride and the above lithium-containing material were evenly mixed according to the mass ratio of 8:1:0.5:0.5 and applied to an aluminum foil current collector to obtain a positive electrode of a battery, graphite served as a negative electrode, a single-layer polyethylene film served as a diaphragm, an ethyl acetate solution of 1M LiClO₄ served as an electrolyte, and a button battery was assembled in a glove box filled with argon gas.

Embodiment 2

A ternary positive electrode material NCM622, carbon black and polyvinylidene fluoride were evenly mixed according to the mass ratio of 8:1:1 and applied to an aluminum foil current collector to obtain a positive electrode of a battery, graphite and the lithium-containing material in Embodiment 1 were evenly mixed according to the mass ratio of 9:1 and then applied to copper foil to obtain a negative electrode of the battery, a single-layer polyethylene film served as a diaphragm, an ethyl acetate solution of 1M LiClO₄ served as an electrolyte, and a button battery was assembled in a glove box filled with argon gas.

Embodiment 3

A ternary positive electrode material NCM622, carbon black and polyvinylidene fluoride were evenly mixed according to the mass ratio of 8:1:1 and applied to an aluminum foil current collector to obtain a positive electrode of a battery, graphite served as a negative electrode, the lithium-containing material in Embodiment 1 was applied to a single-layer polyethylene film to serve as a diaphragm, an ethyl acetate solution of 1M LiClO₄ served as an electrolyte, and a button battery was assembled in a glove box filled with argon gas.

Embodiment 4

It can be seen from appearance that a lithium-containing material in this embodiment is white powder, and the general formula of the lithium-containing material satisfies $Li_{1+x}M_{1-x}Al(PO_4)O_{1-y}F_{2y}$. The chemical formula is $Li_2Al(PO_4)O_{0.95}F_{0.1}$ when element M does not exist. Specifically, the lithium-containing material comprises, by mass, about 10% of lithium, 38% of aluminum, 26% of phosphorus, about 20% of fluorine, and about 6% of oxygen.

Tests showed that a tap density of the material was 0.84 $g/cm^3$.

ICP elemental analysis of the material showed that the content of lithium was 10.1%, the content of aluminum was 37.6%, the content of Cr was 0.0326 ppm, the content of Fe was 0.3957 ppm, the content of Ni was 0.0306 ppm, the content of Zr was 0.0053 ppm, the content of Co was 0.0002 ppm, and the total content of magnetic substances was 0.4644 ppm.

A ternary positive electrode material NCM622, carbon black, polyvinylidene fluoride and the above lithium-containing material were evenly mixed according to the mass ratio of 8:1:0.5:0.5 and applied to an aluminum foil current collector to obtain a positive electrode of a battery, graphite served as a negative electrode, a single-layer polyethylene film served as a diaphragm, an ethyl acetate solution of 1M LiClO₄ served as an electrolyte, and a button battery was assembled in a glove box filled with argon gas.

Embodiment 5

A ternary positive electrode material NCM622, carbon black and polyvinylidene fluoride were evenly mixed according to the mass ratio of 8:1:1 and applied to an aluminum foil current collector to obtain a positive electrode of a battery, graphite and the lithium-containing material in Embodiment 4 were evenly mixed according to the mass ratio of 9:1 and then applied to copper foil to obtain a negative electrode of the battery, a single-layer polyethylene film served as a diaphragm, an ethyl acetate solution of 1M LiClO₄ served as an electrolyte, and a button battery was assembled in a glove box filled with argon gas.

Embodiment 6

A ternary positive electrode material NCM622, carbon black and polyvinylidene fluoride were evenly mixed according to the mass ratio of 8:1:1 and applied to an aluminum foil current collector to obtain a positive electrode of a battery, graphite served as a negative electrode, the lithium-containing material in Embodiment 4 was applied to a single-layer polyethylene film to serve as a diaphragm, an ethyl acetate solution of 1M LiClO₄ served as an electrolyte, and a button battery was assembled in a glove box filled with argon gas.

Embodiment 7

It can be seen from appearance that a lithium-containing material in this embodiment is white powder, and the general formula of the lithium-containing material satisfies $Li_{1+x}$ $M_{1-x}Al(PO_4)O_{1-y}F_{2y}$, where M is preferably hydrogen (H), in which case the chemical formula is $LiHAl(PO_4)$ $O_{0.96}F_{0.08}$. Specifically, the lithium-containing material comprises, by mass, about 4.7% of lithium, 35.6% of aluminum, 24.7% of phosphorus, about 18.5% of fluorine, about 5.3% of oxygen, and about 1.68% of hydrogen. An XRD diffraction pattern of the material is shown in FIG. 1, where obvious characteristic diffraction peaks can be seen at positions where 2θ is 28°, 30° and 19°.

Tests showed that a tap density of the material was 1.08 $g/cm^3$.

ICP elemental analysis of the material showed that the content of lithium was 8.45%, the content of aluminum was 34.7%, the content of Cr was 0.1298 ppm, the content of Fe was 1.2052 ppm, the content of Ni was 0.0276 ppm, the content of Zr was 0 ppm, the content of Co was 0.0006 ppm, and the total content of magnetic substances was 1.3632 ppm.

A ternary positive electrode material NCM622, carbon black, polyvinylidene fluoride and the above lithium-containing material were evenly mixed according to the mass ratio of 8:1:0.5:0.5 and applied to an aluminum foil current collector to obtain a positive electrode of a battery, graphite served as a negative electrode, a single-layer polyethylene film served as a diaphragm, an ethyl acetate solution of 1M aluminum foil current collector to obtain a positive electrode of a battery, graphite served as a negative electrode, the lithium-containing material in Embodiment 7 was applied to a single-layer polyethylene film to serve as a diaphragm, an ethyl acetate solution of 1M $LiClO_4$ served as an electrolyte, and a button battery was assembled in a glove box filled with argon gas.

Comparative Example

A ternary positive electrode material NCM622, carbon black and polyvinylidene fluoride were evenly mixed according to the mass ratio of 8:1:1 and applied to aluminum foil to obtain a positive electrode of a battery, graphite served as a negative electrode, a single-layer polyethylene film served as a diaphragm, an ethyl acetate solution of 1M $LiClO_4$ served as an electrolyte, and a button battery was assembled in a glove box filled with argon gas.

Battery performance testing: The button batteries prepared in Embodiments 1-9 and Comparative Example were tested for the specific discharge capacity at different rates (1 C-10 C) under the charge and discharge voltage window of 1 V-2.5 V, self-discharge performance K value after standing for 7 days and 15 days, and temperature rise at a center point of a surface of the battery during discharge at different rates. Further, the initial specific capacity and specific capacity after cyclic charging and discharging for 100 times were also tested, and the test results are shown in Table 1.

TABLE 1

| | Self-discharge K value | | Rate discharge capacity (mAh/g) | | | | Rate discharge temperature rise (K) | | | | Cycling property (mAh/g) | |
|---|---|---|---|---|---|---|---|---|---|---|---|---|
| | 7 days | 15 days | 1 C | 2 C | 5 C | 10 C | 1 C | 2 C | 5 C | 10 C | Initial | Cycle 100 times |
| Embodiment 1 | 15.8 | 11.7 | 194.2 | 192.3 | 189.4 | 185.5 | 0.5 | 1.1 | 1.8 | 2.5 | 195 | 167.3 |
| Embodiment 2 | 17.5 | 13.6 | 194.3 | 193.8 | 188.2 | 186.3 | 0.6 | 1.1 | 1.8 | 2.4 | 195.4 | 170.5 |
| Embodiment 3 | 17.9 | 10.8 | 194.7 | 191.6 | 190.5 | 188.6 | 0.3 | 0.9 | 1.5 | 2 | 194.2 | 168.7 |
| Embodiment 4 | 19.8 | 14.2 | 193.9 | 189.2 | 186.1 | 184.8 | 0.5 | 0.9 | 1.6 | 2.3 | 193.8 | 164.8 |
| Embodiment 5 | 20.7 | 16.5 | 194 | 192.5 | 188.4 | 185.2 | 1 | 1.5 | 2.1 | 2.6 | 195 | 169.3 |
| Embodiment 6 | 16.4 | 11.3 | 194.6 | 192.8 | 190.9 | 189.2 | 0.9 | 1.3 | 1.6 | 1.9 | 192.4 | 163.9 |
| Embodiment 7 | 15.7 | 11.5 | 194.6 | 192.4 | 188.9 | 186.5 | 0.5 | 1.0 | 1.7 | 1.5 | 195.6 | 168.2 |
| Embodiment 8 | 17.5 | 13.4 | 194.4 | 194.5 | 189.7 | 187.1 | 0.5 | 1.1 | 1.7 | 2.5 | 195.1 | 171.1 |
| Embodiment 9 | 17.6 | 10.5 | 194.1 | 192.6 | 190.1 | 188.4 | 0.3 | 0.8 | 1.5 | 2.1 | 194.5 | 168.5 |
| Comparative example | 27.8 | 21.4 | 175.3 | 170.2 | 162.3 | 142.7 | 1.5 | 2.3 | 3.6 | 5 | 180.5 | 145.6 |

$LiClO_4$ served as an electrolyte, and a button battery was assembled in a glove box filled with argon gas.

Embodiment 8

A ternary positive electrode material NCM622, carbon black and polyvinylidene fluoride were evenly mixed according to the mass ratio of 8:1:1 and applied to an aluminum foil current collector to obtain a positive electrode of a battery, graphite and the lithium-containing material in Embodiment 7 were evenly mixed according to the mass ratio of 9:1 and then applied to copper foil to obtain a negative electrode of the battery, a single-layer polyethylene film served as a diaphragm, an ethyl acetate solution of 1M $LiClO_4$ served as an electrolyte, and a button battery was assembled in a glove box filled with argon gas.

Embodiment 9

A ternary positive electrode material NCM622, carbon black and polyvinylidene fluoride were evenly mixed according to the mass ratio of 8:1:1 and applied to an According to the values in Table 1, 5 C/1 C, 10 C/1 C and the capacity retention rate after 100 cycles were calculated and listed in Table 2 below.

TABLE 2

| | Performance index | | Capacity retention rate |
|---|---|---|---|
| | 5 C/1 C (%) | 10 C/1 C (%) | after 100 cycles |
| Embodiment 1 | 97.5 | 95.5 | 85.80% |
| Embodiment 2 | 96.9 | 96.9 | 87.30% |
| Embodiment 3 | 97.8 | 96.9 | 86.90% |
| Embodiment 4 | 96 | 95.3 | 85.00% |
| Embodiment 5 | 97.1 | 95.5 | 86.80% |
| Embodiment 6 | 98.1 | 97.2 | 85.20% |
| Embodiment 7 | 97.6 | 96.3 | 85.6% |
| Embodiment 8 | 97.1 | 96.8 | 87.2% |
| Embodiment 9 | 98.1 | 96.8 | 87.1% |
| Comparative example | 92.1 | 80.2 | 75.10% |

It can be seen from the data that the 5 C/1 C rate performance and 10 C/1 C rate performance of Embodiments 1-9 were higher than those of the Comparative example; the capacity retention rate after 100 cycles was also significantly higher than that of the Comparative example; and when discharging at different rates, the temperature rise increased with the increase of the discharge rate, and under the same rate, the temperature rise of the Comparative example was higher than that of Embodiments 1-9. Further, the self-discharge K value of the Embodiments was obviously smaller than that of the Comparative example under the same standing time.

From the data in Table 1, it can be seen that the specific capacity and initial cycling property of the button batteries prepared by adding lithium-containing materials in Embodiments 1-9 of the present disclosure were obviously better than those of the button battery in the Comparative example. The reason may be that the addition of lithium-containing materials increases the number of lithium ions during charging and discharging, so sufficient lithium ions are provided for forming SEI films, thus improving the initial cycling property and specific capacity.

During discharging of lithium-ion batteries, lithium tablets will dissolve into lithium ions, and during charging, lithium ions are reduced to metallic lithium. In the reduction process, due to thermodynamic reasons, lithium is deposited unevenly, thus generating dendritic lithium. Existing research shows that lithium dendrites may become "dead lithium," resulting in irreversible loss of capacity, thus affecting the discharge efficiency; moreover, lithium dendrites may also cause serious security problems, such as diaphragm penetration, short-circuiting and battery explosion. According to the data in Table 1 and Table 2, it can be seen that the rate discharge capacity of the button batteries prepared by adding lithium-containing materials (whether to the positive electrode or negative electrode or diaphragm) was obviously higher than that of the button battery in the Comparative example; and the capacity retention rate after 100 cycles was high (85% or more). However, in the Comparative example, the battery prepared without adding lithium-containing materials had a low-capacity retention rate (less than 75%) after the same number of cycles. According to the test data results, it is speculated that a uniform and stable solid-liquid phase interface is formed between the electrode material prepared by using the lithium-containing material provided by the present disclosure as an additive and an electrolyte, which induces the uniform deposition of metallic lithium, and this interface may be related to the reduction of lithium in the lithium-containing material, thereby inhibiting the generation of lithium dendrites, reducing the generation of "dead lithium," and then reducing the loss of battery capacity; as a result, a high battery rate discharge capacity is realized. In addition, according to the data of temperature rise at the center point of the surface of the battery at different rates in Table 1, the temperature rise of the battery added with the lithium-containing material of the present disclosure is lower than that of the Comparative example by more than half under the same rate. The decrease of the service temperature also greatly improves the safety of the battery and avoids harm caused by high temperature.

Figure 2:
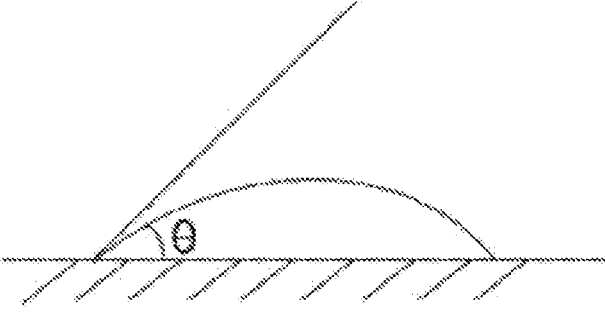
FIG. 2 is a principal diagram of a contact angle described in the embodiment of the present disclosure.

In addition, the wettability between the electrolyte and the positive electrode, negative electrode and diaphragm will affect the shuttling of lithium ions between the positive electrode and the negative electrode and the interface resistance of the battery, and then affect the discharge rate, discharge capacity and working voltage of the battery. Therefore, a good wettability of electrode materials is beneficial to the improvement of battery performance. The diaphragms prepared in Embodiment 6 and Comparative example were tested; the negative electrode prepared by mixing graphite with the lithium-containing material in Embodiment 5 and the negative electrode made of graphite in Comparative example were tested; and the positive electrode prepared by mixing the ternary positive electrode material NCM622, carbon black, polyvinylidene fluoride and the lithium-containing material in Embodiment 4 and the positive electrode prepared by adding no lithium-containing material in Comparative example were tested. FIG. 2 is a principal diagram of a contact angle. In this embodiment, the same electrolyte was dropped on the diaphragm, positive electrode and negative electrode prepared by adding lithium-containing materials, and the diaphragm, positive electrode and negative electrode without lithium-containing materials. The contact angles of the electrolyte with the diagram, positive electrode and negative electrode were measured by a contact angle measuring instrument to compare the influence of lithium-containing materials on the wettability of battery materials.

TABLE 3

| | Contact angle θ |
|---|---|
| Diaphragm in Embodiment 6 | 25° 6' |
| Diaphragm in Comparative example | 27° 2' |
| Negative electrode in Embodiment 5 | 24° 3' |
| Negative electrode in Comparative example | 27° 6' |
| Positive electrode in Embodiment 4 | 25° 5' |
| Positive electrode in Comparative example | 26° 4' |

By comparing the measured contact angles, it was found that the contact angle between an electrode plate or diaphragm prepared by adding lithium-containing materials and the electrolyte was smaller; and the smaller the contact angle, the better the wettability of the material. The test results show that the addition of lithium-containing materials improves the wettability of the material in the same electrolyte. Therefore, the lithium-containing material has a good wettability.

In order to detect the influence of the lithium-containing material on the resistivity of positive and negative electrode plates, the resistivity of a positive electrode plate in Embodiment 4 and a negative electrode plate in Embodiment 5, and the resistivity of a positive electrode plate and a negative electrode plate in Comparative example were tested with a resistivity tester, and the test results are shown in Table 4.

TABLE 4

| Group | Resistivity of electrode plate (mΩ) |
|---|---|
| Embodiment 4 | 15.6 |
| Positive electrode in Comparative example | 167.5 |
| Embodiment 5 | 16.8 |
| Negative electrode in Comparative example | 178.5 |

From the data in Table 4, it can be seen that the resistivity of the positive electrode and negative electrode prepared by adding lithium-containing materials is obviously lower than that of the positive electrode and negative electrode without lithium-containing materials in Comparative example. The reason may be that the lithium-containing material has a good lithium-ion conductivity, which further reduces the resistivity of electrode plates.

To sum up, the lithium-containing material, as the additive material of a lithium battery, can improve the rate performance of the battery, improve the service life and cycling property of the lithium battery, greatly improve the safety property of the lithium battery, and allow the battery to keep a good energy density.

The above-mentioned specific embodiments further explain the purpose, technical scheme and beneficial effects of the present disclosure in detail. It should be understood that the above are only specific embodiments of the present disclosure and are not used to limit the scope of protection of the present disclosure. Any modification, equivalent substitution, improvement, etc., made within the spirit and principles of the present disclosure should be included in the scope of protection of the present disclosure.

What is claimed is:

1. A lithium-containing material, comprising:
white powder comprising components of lithium (Li), aluminum (Al), phosphorus (P), fluorine (F), and oxygen (O), by mass, more than 0% and less than or equal to 12% Li; 5%-40% Al; 1%-35% P; 0.4%-22% F; and 2%-34% O;
wherein the lithium-containing material is used as one of an electrode additive material and a diaphragm coating material of a lithium-ion battery.

2. The lithium-containing material of claim 1, wherein an X-ray diffraction (XRD) pattern of the lithium-containing material has characteristic diffraction peaks at positions where 2θ is 28°, 30° and 19°.

3. The lithium-containing material of claim 1, wherein a tap density of the lithium-containing material is within a range of 0.60 g/cm$^3$ to 1.48 g/cm$^3$.

4. The lithium-containing material of claim 1, wherein a solubility of the lithium-containing material is less than 1 g/100 g in water, ethanol and N-methylpyrrolidone (NMP).

5. The lithium-containing material of claim 1, wherein a total content of magnetic impurities in the lithium-containing material is less than 1.5 part per million (ppm), and the magnetic impurities comprise one or more of Cr, Fe, Ni, Zn and Co.

6. The lithium-containing material of claim 5, wherein for the lithium-containing material:
a content of Cr is ≤0.15 parts per million (ppm);
a content of Fe is ≤1.35 ppm;
a content of Ni is ≤0.04 ppm;
a content of Zn is ≤0.01 ppm; and
a content of Co is ≤0.01 ppm.

7. The lithium-containing material of claim 1, wherein the lithium-containing material is doped with element M, wherein:
a content of the element M in the lithium-containing material is within a range of 0%-30%; and
the element M is selected from H, K, Cl, and Na.

8. The lithium-containing material of claim 7, wherein a general formula of the lithium-containing material is $Li_{1+x}M_{1-x}Al(PO_4)O_{1-y}F_{2y}$, and wherein 0≤x≤1 and 0<y<0.1.

9. The lithium-containing material of claim 1, wherein a general formula of the lithium-containing material is $Li_{1+x}M_{1-x}Al(PO_4)O_{1-y}F_{2y}$, and wherein 0≤x≤1 and 0<y<0.1.

* * * * *